United States Patent [19]

Ito

[11] Patent Number: 5,693,126
[45] Date of Patent: Dec. 2, 1997

[54] WATER-BASE INK COMPOSITION AND PROCESS FOR PRODUCING THE SAME

[75] Inventor: Hiroshi Ito, Suwa, Japan

[73] Assignee: Seiko Epson Corporation, Tokyo-To, Japan

[21] Appl. No.: 579,102

[22] Filed: Dec. 27, 1995

[30] Foreign Application Priority Data

Dec. 27, 1994 [JP] Japan .................................. 6-325627

[51] Int. Cl.$^6$ .................................................. C09D 11/02
[52] U.S. Cl. ...................... 106/20 R; 106/22 A; 106/22 H
[58] Field of Search .......................... 106/20 R, 23 A, 106/23 H, 22 A, 22 H

[56] References Cited

U.S. PATENT DOCUMENTS

| | | | |
|---|---|---|---|
| 4,281,329 | 7/1981 | Yano et al. | 106/22 H |
| 5,000,786 | 3/1991 | Matsuzaki | 106/20 D |
| 5,017,224 | 5/1991 | Tomita et al. | 106/20 R |
| 5,173,112 | 12/1992 | Matrick et al. | 106/22 H |
| 5,224,987 | 7/1993 | Matrick | 106/22 R |
| 5,298,062 | 3/1994 | Davies et al. | 106/22 A |
| 5,409,530 | 4/1995 | Kanabayashi et al. | 106/22 A |
| 5,427,611 | 6/1995 | Shirota et al. | 106/22 H |
| 5,538,550 | 7/1996 | Yaegashi et al. | 106/22 A |
| 5,580,373 | 12/1996 | Lane et al. | 106/22 H |

*Primary Examiner*—Helene Klemanski
*Attorney, Agent, or Firm*—Ladas & Parry

[57] ABSTRACT

A water-base ink composition which can provide a print having better water resistance, stably contains a colorant virtually insoluble or sparingly soluble in water, is less likely to cause clogging of a recording head, and can be advantageously used for ink jet recording is disclosed. The water-base ink composition comprises a colorant which is either sparingly soluble or insoluble in water; a solid solvent which is solid at room temperature and soluble in water and can dissolve, in the form of a hot melt or aqueous solution thereof, the colorant and, can form a solid solution together with the colorant; and water.

20 Claims, No Drawings

WATER-BASE INK COMPOSITION AND PROCESS FOR PRODUCING THE SAME

BACKGROUND OF THE INVENTION

1. Field of the Invention

This invention relates to an ink jet recording system and more particularly a water-base ink composition, which can provide prints having high fastness, and a process for producing the same.

2. Background Art

In the conventional ink jet recording system, ink droplets are ejected and deposited onto a recording paper by means of an electrostatic suction method, a pneumatic ink feed method, a method utilizing electric deformation of an piezoelectric element, and a method utilizing pressure generated by heat foaming. In this recording system, the ink used is mainly a water-base ink composition comprising a solution of a water-soluble dye dissolved in water and, dissolved therein, a humectant, such as a glycol, and a penetration promoter, such as an alcohol or pyrrolidone.

A print provided by the water-base ink composition using a water-soluble dye has a drawback that, upon contact with water, the dye is eluted from the printed area because of its water-soluble nature. Further, in general, since the water-soluble dye has a water-soluble group, such as a carboxylic, sulfonic, or amine group, it is said to be inferior in light fastness to water-insoluble colorants.

Various water-base ink compositions and processes for producing the same have been proposed in the art in order to solve these problems. For example, Japanese Patent Laid-Open Nos. 59970/1982, 53372/1986, and 162773/1988 disclose an ink composition using a dye which is insoluble in water but soluble in a water-soluble organic solvent.

Further, Japanese Patent Laid-Open No. 4665/1984 proposes a water-base ink composition using a disperse dye, and Japanese Patent Laid-Open No. 147859/1981 proposes a water-base ink composition with a water-insoluble pigment dispersed therein.

These water-base ink compositions, however, have still room for improvement. In particular, the use of a colorant virtually insoluble or sparingly soluble in water for the purpose of improving the water resistance of the print is likely to cause clogging of a nozzle in a recording head. The reason for the occurrence of this unfavorable phenomenon is considered to be reside in that it is not easy for a colorant virtually insoluble or sparingly soluble in water to stably exist in a water-base ink composition and that the sparingly soluble colorant is precipitated at the front end of the nozzle in the recording head.

SUMMARY OF THE INVENTION

An object of the present invention is to provide a water-base ink composition, which can provide a print having better water resistance, stably contains a colorant which is virtually insoluble or sparingly soluble in water, and is less likely to cause clogging of a recording head, and a process for producing the same.

The present inventors have now found that the addition of a specific component to an ink composition can provide an ink composition stably containing a colorant which is insoluble or sparingly soluble in water.

Accordingly, the ink composition of the present invention comprises:

a colorant which is either sparingly soluble or insoluble in water;

a solid solvent which is solid at room temperature and soluble in water and can dissolve, in the form of a hot melt or aqueous solution thereof, the colorant and, can form a solid solution together with the colorant; and water.

The ink composition of the present invention may be produced by a process comprising the steps of:

heating the solid solvent at the melting point or above to form a hot melt and dissolving a colorant in the melt to prepare a colorant solution, or dissolving a colorant in an aqueous solution to prepare a colorant solution wherein the aqueous solution is an aqueous saturated solid solvent solution or an aqueous solid solvent solution having a high concentration close to the saturation;

mixing the colorant solution in a hot melt form with water or an aqueous solution containing a water-soluble organic solvent to prepare a dispersion in which particles of the colorant are dispersed; and adding an optional component, for forming an ink composition, to the dispersion.

Further, the ink composition of the present invention may be produced also by a process comprising the steps of:

heating the solid solvent at the melting point or above to form a hot melt and dissolving a colorant in the melt to prepare a colorant solution, and cooling the colorant solution to prepare a colorant solid solution containing the colorant and the solid solvent, or mixing a solid solvent with a volatile organic solvent, dissolving a colorant in the mixture to prepare a colorant solution, and removing the volatile organic solvent by evaporation from the colorant solution to prepare a colorant solid solution;

dissolving the colorant solid solution in water or an aqueous solution containing a water-soluble organic solvent to prepare a dispersion in which particles of the colorant are dispersed; and adding an optional component, for forming an ink composition, to the dispersion.

PREFERRED EMBODIMENTS OF THE INVENTION

The water-base ink composition of the present invention comprises basically a colorant either sparingly soluble or insoluble in water, a solid solvent, and water.

Colorant

The colorant used in the present invention is a dye or pigment which is either sparingly soluble or insoluble in water. The "either sparingly soluble or insoluble in water" means that the solubility in water at 20° C. is not more than about 1% by weight, still preferably not more than 0.1% by weight. Preferred examples of the dye or pigment include colorants which are classified, in the art, as oil dyes and disperse dyes or pigments readily soluble in an organic solvent. The use of the above colorants can provide prints having excellent fastness, particularly good water resistance and light fastness. These colorants may be used alone or as a mixture of two or more.

In the ink composition of the present invention, the colorant is preferably present in a dispersed state. Specifically, the colorant is present as fine particles in the ink composition of the present invention. It is not easy to define the boundary between the dissolution of a substance and the dispersion of the substance. However, according to a preferred embodiment of the present invention, the colorant can be found as particles in the ink composition. Color development of a print using the ink composition of the present invention depends mainly upon the colorant particles. According to a preferred embodiment of the present invention, the colorant particles have an average particle diameter of preferably about 10 nm to 10 µm, still preferably about 25 to 500 nm. Further, according to a preferred embodiment of the present invention, the colorant particles are preferably regulated, from the viewpoint of preventing clogging, so as to have such a distribution in number of particles that the amount of the particles having a diameter exceeding 20 µm is less than 1 ppm.

On the other hand, according to a preferred embodiment of the present invention, the ink composition of the present invention is substantially free from any dispersant. For a person having ordinary skill in the art, it will be surprising that colorant particles are dispersible in an ink composition substantially without any dispersant. The expression "substantially free from any dispersant" means that any dispersant Commonly used in conventional ink compositions is not contained at all or is contained in a concentration on below the critical micell concentration (CMC). In general, the critical micell concentration is from about 0.01 to 3.6% by weight depending upon the kind of the dispersant ("Shin Han Kaimen Kassei Zai Hando Bukku," 119–127 (1991), Yoshida, Shindo, Ohgaki, and Nakayama, published by Kogaku Tosho K.K.). Therefore, according to a preferred embodiment of the present invention, the dispersant is contained preferably in a concentration below the critical micell concentration.

The colorant used in the present invention should be soluble in a solid solvent which will be described below.

The amount of the colorant added is preferably 0.5 to 20% by weight, still preferably about 1 to 10% by weight, based on the ink composition.

Specific preferred examples of the colorant include:

yellow oil dyes, such as Oil Yellow 105 (trade name, Orient Chemical Industries, Ltd.), Oil Yellow 107 (trade name, Orient Chemical Industries, Ltd.), Oil Yellow 129 (trade name, Orient Chemical. Industries, Ltd., C.I. Solvent Yellow 29), Oil Yellow 3G (trade name, Orient Chemical Industries, Ltd., C.I. Solvent Yellow 16), Oil Yellow GGS (trade name, Orient Chemical Industries, Ltd., C.I. Solvent Yellow 56), Valifast Yellow 1101 (trade name, Orient Chemical Industries, Ltd.), Valifast Yellow 1105 (trade name, Orient Chemical Industries, Ltd.), Valifast Yellow 4120 (trade name, Orient Chemical Industries, Ltd., C.I. Solvent Yellow 82), Oleosol Brilliant Yellow 5G (trade name, Taoka Chemical Co., Ltd., C.I. Solvent Yellow 150), Oleosol Fast Yellow 2G (Taoka Chemical Co., Ltd., C.I. Solvent Yellow 21), Oleosol Fast Yellow GCN (Taoka Chemical Co., Ltd., C.I. Solvent Yellow 151), Aizen Sot Yellow 1 (trade name, Hodogaya Chemical Co., Ltd., C.I. Solvent Yellow 56), Aizen Sot Yellow 3 (trade name, Hodogaya Chemical Co., Ltd., C.I. Solvent Yellow 16), Aizen Sot Yellow 6 (trade name, Hodogaya Chemical Co., Ltd., C.I. Solvent Yellow 33), Aizen Spilon Yellow GRLH (trade name, Hodogaya Chemical Co., Ltd.), Aizen Spilon Yellow 3RH (trade name, Hodogaya Chemical Co., Ltd.), Orasol Yellow 2GLN (trade name, Ciba-Geigy, C.I. Solvent Yellow 88), Orasol yellow 2RLN (trade name, Ciba-Geigy, C.I. Solvent Yellow 89), Orasol Yellow 3R (trade name, Ciba-Geigy, Solvent Yellow 25), Oracet Yellow GHS (trade name, Ciba-Geigy, C.I. Solvent Yellow 163), and FILAMID Yellow R (trade name, Ciba-Geigy, C.I. Solvent Yellow 21);

red oil dyes, such as Oil Red 5B (trade name, Orient Chemical Industries, Ltd., C.I. Solvent Red 27), Oil RED RR (trade name, Orient Chemical Industries, Ltd., C.I. Solvent Red 24), Valifast Red 1306 (trade name, Orient Chemical Industries, Ltd., C.I. Solvent Red 109), Valifast Red 1355 (trade name, Orient Chemical Industries, Ltd.), Valifast Red 2303 (trade name, Orient Chemical Industries, Ltd.), Valifast Red 3304 (trade name, Orient Chemical Industries, Ltd., C.I. Solvent Red 8), Valifast Red 3306 (trade name, Orient Chemical Industries, Ltd.), Valifast Red 3320 (trade name, Orient Chemical Industries, Ltd., C.I. Solvent Red 132), Oil Pink 312 (trade name, Orient Chemical Industries, Ltd.), Valifast Pink 2310N (trade name, Orient Chemical Industries, Ltd., C.I. Solvent Red 218), Oleosol Fast Red BL (trade name, Taoka Chemical Co., Ltd., C.I. Solvent Red 132), Oleosol Fast Red RL (trade name, Taoka Chemical Co., Ltd., C.I. Solvent Red 122), Oleosol Fast Red GL (trade name, Taoka Chemical Co., Ltd., C.I. Solvent Red 132), Oleosol Red 2G (trade name, Taoka Chemical Co., Ltd.), Oleosol. Fast Pink FB (trade name, Taoka Chemical Co., Ltd., C.I. Solvent Red 218), Aizen Sot Red 1 (trade name, Hodogaya. Chemical. Co., Ltd., C.I. Solvent Red 24), Aizen Sot Red 2 (trade name, Hodogaya chemical Co., Ltd., C.I. Solvent Red 27), Aizen Sot Red 3 (trade name, Hodogaya Chemical Co., Ltd., C.I. Solvent Red 18), Aizen Spilon Red BEH (trade name, Hodogaya Chemical Co., Ltd.), Aizen Spilon Red BEH (trade name, Hodogaya Chemical Co., Ltd.), Aizen Spilon Red C-GH (trade name, Hodogaya Chemical Co., Ltd.), Aizen Sot Pink 1 (trade name, Hodogaya Chemical Co., Ltd., C.I. Solvent Red 49), Orasol, Red 3GL (trade Dame, Ciba-Geigy, C.I. Solvent Red 130), Orasol Red. 2BL (trade name, Ciba-Geigy, C.I. Solvent Red 133), Orasol Red G (trade name, Ciba-Geigy, C.I. Solvent Red 125), Orasol Red B (trade name, Ciba-Geigy, C.I. Solvent Red 7), FILAMID Red GR (trade name, Ciba-Geigy, C.I. Solvent Red. 225), FILESTER Red GA (trade name, Ciba-Geigy, C.I. Solvent Red 135), FILESTER Red RBA (trade name, Ciba-Geigy, C.I. Solvent Red 230), and Oresol Pink 5BLG (trade name, Ciba-Geigy, C.I. Solvent Red 127);

blue oil dyes, such as Oil Blue 613 (trade name, Orient Chemical Industries, Ltd.), Oil Blue 2N (trade name, Orient Chemical-industries, Ltd., C.I. Solvent Blue 35), Oil Blue BOS (trade name, Orient Chemical Industries, Ltd.), Valifast Blue 1603 (trade name, Orient Chemical Industries, Ltd.), Valifast Blue 1605 (trade name, Orient Chemical industries., Ltd., C.I. Solvent Blue 38), Valifast Blue 1607 (trade name, Orient Chemical Industries, Ltd.), Valifast Blue 2606 (trade name, Orient Chemical Industries, Ltd., C.I. Solvent Blue 70), Valifast Blue 2610 (trade name, Orient Chemical Industries, Ltd.), Oleosol Fast Blue ELN (trade name; Taoka Chemical Co., Ltd., C.I. Solvent Blue 70), Oleosol Fast Blue GL (trade name, Taoka Chemical Co., Ltd., C.I. Solvent Blue 70), Oleosol Blue G (trade name, Taoka Chemical Co., Ltd.), Aizen Sot Blue 1 (trade name, Hodogaya Chemical Co., Ltd., C.I. Solvent Blue 25), Aizen Sot Blue 2 (trade name, Hodogaya Chemical Co., Ltd., C.I. Solvent Blue 14), Aizen Spilon Blue GNH (trade name, Hodogaya Chemical Co., Ltd.), Aizen Spilon Blue 2BNH (trade name, Hodogaya Chemical Co., Ltd.), Aizen Spilon Blue BPNH (trade name, Hodogaya Chemical Co., Ltd.), Orasol Blue GN (trade name, Ciba-Geigy, C.I. Solvent Blue 67), Oresol Blue 2GLN (trade name, Ciba-Geigy, C.I. Solvent Blue 48), Oracet Blue 2R (trade name, Ciba-Geigy, C.1. Solvent Blue 68), FILAMID Blue R (trade name, Ciba-Geigy, C.I. Solvent Blue 132), and FILESTER Blue GN (trade name, Ciba-Geigy, C.I. Solvent Blue 67); and black oil dyes, such as Oil Black HBB (trade name, Orient Chemical Industries, Ltd., C.I. Solvent Black 3), Oil Black 860 (trade name, Orient Chemical Industries, Ltd., C.I. Solvent Black 3), Oil Black BS (trade name, Orient Chemical Industries, Ltd., C.I. Solvent Black 7), Valifast Black 1802 (trade name, Orient Chemical Industries, Ltd.), Valifast Black 1807 (trade name, Orient Chemical Industries, Ltd.), Valifast Black 3804 (trade name, Orient Chemical Industries, Ltd., C.I. Solvent Black 34), Valifast Black 3810 (trade name, Orient Chemical Industries, Ltd., C.I. Solvent Black 29), Valifast Black 3820 (trade name, Orient Chemical Industries, Ltd., C.I. Solvent Black 27), Valifast Black 3830 (trade name, Orient Chemical Industries, Ltd.), Spirit Black SB (trade name, Orient Chemical Industries, Ltd., C.I. Solvent Black 5), Spirit Black SSBB (trade name, Orient Chemical Industries, Ltd., C.I. Solvent Black. 5), Spirit Black AB (trade name, Orient Chemical Industries, Ltd., C.I. Solvent Black 5), Nigrosin base (trade name, Orient Chemical Industries, Ltd., C.I. Solvent Black 7), Oleosol Fast Black RL (trade name, Taoka Chemical Co., Ltd., C.I. Solvent Black 27), Oleosol Fast Black AR (trade name, Taoka Chemical Co., Ltd.), Aizen Sot Black 6 (trade name, Hodogaya Chemical Co., Ltd., C.I. Solvent Black 3), Aizen Sot Black 8 (trade name, Hodogaya Chemical Co., Ltd., C.I. Solvent Black 7), Aizen Spilon Black MH (trade name, Hodogaya Chemical Co., Ltd.), Aizen Spilon Black GMH (trade name, Hodogaya Chemical Co., Ltd.), Orasol Black CN (trade name, Ciba-Geigy, C.I. Solvent Black 28), and Orasol Black RLI (trade name, Ciba-Geigy, C.I. Solvent Black 29).

Specific examples of the disperse dye include Oracet Yellow 8GF (trade name, Ciba-Geigy, C.I. Disperse Yellow 82), Aizen Sot Yellow 5 (trade name, Hodogaya Chemical Co., Ltd., C.I. Disperse Yellow 3), Sumi Plast Yellow HLR (trade name, Sumitomo Chemical Co., Ltd., C.I. Disperse Yellow 54), Kayaset Yellow AG (trade name, Nippon Kayaku Co., Ltd. C.I. Disperse Yellow 54), Sumi Plast Red B-2 (trade name, Sumitomo Chemical Co., Ltd., C.I. Disperse Red 191), Kayaset Red B (trade name, Nippon Kayaku Co., Ltd. C.I. Disperse RED 60), and FILESTER Violet BA (trade name, Ciba.-Geigy, C.I. Disperse Violet 57).

Preferred examples of the pigments readily soluble in an organic solvent include Hansa Yellow G (trade name, Daido Kasei Co., Ltd., C.I. Pigment Yellow 1), Hansa Yellow GR (trade name, Daido Kasei Co., Ltd., C.I. Pigment Yellow 2), Hansa Yellow 10G (trade name, Daido Kasei Co., Ltd., C.I. Pigment Yellow. 3), FILESTER Yellow RNB (trade name, Ciba-Geigy, C.I. Pigment Yellow 147), Kayaset Yellow AR (trade name, Nippon Kayaku Co., Ltd. C.I. Pigment Yellow 147), Kayaset Yellow E-L2R (trade name, Nippon Kayaku Co., Ltd., C.I. Pigment Yellow.142), Permanent Red 4R (trade name, Daido Kasei Co., Ltd., C.I. Pigment Red 3), Poppy Red (Dainichiseika Color&.Chemicals Manufacturing, Co., Ltd., C.I. Pigment Red 17), Brilliant Fast Scarlet (trade name, Daido Kasei Co., Ltd., C.I. Pigment Red 22), 3040 Red (trade name, Dainichiseika Color & Chemicals Manufacturing. Co., Ltd., C.I. Pigment. Red 23), Fast Pink Lake 6G (trade name, Noma Kagaku Kogyo K.K., C.I. Pigment Red 81), Eosine Lake (trade name, Arimoto Chemical Company, Ltd., C.I. Pigment Red 90), Kayaset Red E-CG (trade name, Nippon Kayaku Co., Ltd. C.I. Pigment Red 250), Kayaset Red E-BG (trade name, Nippon Kayaku Co., Ltd. C.I. Pigment Red 249), Carmine BS (trade name, Dainippon Ink and Chemicals Ink., C.I. Pigment Red 114), and Oracet Pink RF (trade name, Ciba-Geigy, C.I. Pigment Red 181).

Solid solvent

The solid solvent used in the present invention is a solvent which is solid at room temperature and soluble in water and can dissolve, in the form of a hot melt or aqueous solution thereof, the colorant and, together with the colorant, form a solid solution.

The solid solvent is solid at room temperature with a solid solvent having a melting point of 30° C. or above being preferred. The expression "soluble in water" means that the solubility in water at 20° C. is preferably not less than 15% by weight, still preferably not less than 30% by weight.

In the present invention, when the solid solvent is in the form of a hot melt or an aqueous solution, it can dissolve the above colorant. The expression "when the solid solvent in the form of a hot melt, it can dissolve the colorant" means that the solubility of the colorant in the hot melt is preferably not less than 1% by weight, still preferably not less than 5% by weight.

Further, in the present invention, the expression "the solid solvent, together with the colorant, forms a solid solution" means that a mixed phase is formed wherein the colorant has been dissolved into the crystalline phase of the solid phase.

The use of the solid solvent having the above properties in combination with the above colorant can effectively prevent a nozzle from being clogged. While there is no intention of being bound by any particular theory to account for effective prevention of clogging, the reason for this is believed as follows. When a precipitate occurs as a result of drying of the ink composition of the present invention at the front end of the nozzle, the precipitate is composed mainly of a solid solvent/colorant solid solution. The formation of a precipitate consisting essentially of the colorant sparingly soluble or insoluble in water is prevented. Upon resumption of the supply of the ink composition into the nozzle, the solid solution is easily dissolved in the ink composition and consequently disintegrated. This causes the precipitate clogging the nozzle to be easily removed, thus preventing clogging of the nozzle. In the ink composition of the present invention, the colorant is preferably present as a dispersion of particles rather than as a solution. Therefore, when printing is carried out using the ink composition on a recording medium, such as paper, the colorant particles stay on the surface of the recording medium. Since, however, the solid solvent is dissolved in other the solvent component(s), such as water, it, together with the solvent component, is penetrated into the recording medium. As a result, a print formed on the surface of the recording medium consists essentially of a colorant either sparingly soluble or insoluble in water. The content of the solid solvent in the print is low enough not to adversely affect the water resistance of the print. Thus, good water resistance of the print can be maintained.

The amount of the solid solvent added is preferably in the range of from about 1 to 50% by weight, still preferably from about 2.5 to 25% by weight.

According to a preferred embodiment of the present invention, specific preferred examples of the solid solvent include carboxylic acid derivatives, urea derivatives, and alkylene carbonates.

Specific preferred examples of the carboxylic acid derivatives include compounds having a melting point of 30° C. or above and represented by the following formula (I):

$$R^1—CO—NH—R^2 \quad (I)$$

wherein $R^1$ represents an unsubstituted or substituted alkyl or unsubstituted or substituted alkoxy group or a five- or six-membered heteroaromatic ring containing one nitrogen atom, $R^2$ represents H or an unsubstituted or substituted alkyl group, or $R^1$ and $R^2$ are an unsubstituted or substituted alkylene group having 3 to 8 carbon atoms.

In the formula (i), the alkyl group represented by $R^1$ may be straight chain or branched and preferably an alkyl group having preferably 1 to 8 carbon atoms, still preferably 1 to 6 carbon atoms. One or more hydrogen atoms in the alkyl group may be substituted, and preferred examples of the substituent include a hydroxyl group and an amino group.

The alkoxy group represented by $R^m$ may be straight chain or branched and preferably an alkoxy group having preferably 1 to 8 carbon atoms, still preferably 1 to 6 carbon atoms. One or more hydrogen atoms in the alkoxy group may be substituted, and preferred examples of the substituent include a hydroxyl group and an amino group.

Examples of the five- or six-membered heteroaromatic ring, containing one nitrogen atom, represented by $R^1$ include pyrrolyl and pyridyl.

In the formula (I), the alkyl group represented by $R^2$ may be straight chain or branched and preferably an alkyl group having preferably 1 to 8 carbon atoms, still preferably 1 to 6 carbon atoms. One or more hydrogen atoms in the alkyl group may be substituted, and preferred examples of the substituent include a hydroxyl group and an amino group.

Further, $R^m$ and $R^2$ may combine with each other to form an unsubstituted or substituted alkylene group having 3 to 8 carbon atoms. One or more hydrogen atoms in the alkylene group may be substituted, and preferred examples of the substituent include a hydroxyl group and an amino group.

Specific preferred examples of the carboxylic acid derivative include lactamide (m.p. 49° to 51° C.), acetamide (m.p. 70° C.), N-methyl acetamide (m.p. 31° C.), methyl carbamate (m.p. 54° C.), ethyl carbamate (m.p. 48° C.), ε-caprolactam (m.p. 69° C.), δ-valerolactam (m.p. 37° C.), and nicotinamide (m.p. 130° C.) glycolic amide (m.p. 116° C.), and α-amino-ε-caprolactam (m.p. 73° C.).

Specific preferred examples of the urea derivative as the solid solvent include compounds represented by the following formula (II):

$$R^3—NH—CO—NH—R^4 \quad (II)$$

wherein $R^3$ and $R^4$ each independently represent H or an unsubstituted or substituted alkyl group, or $R^3$ and $R^4$ combine with each other to form an alkylene group having 2 to 6 carbon atoms.

Specific preferred examples of the compounds represented by the formula (II) include dimethylol urea (m.p. 138° C.), ethylene urea (m.p. 131° C.), and monomethylol urea (m.p. 110° C.).

Specific preferred examples of the alkylene carbonate as the solid solvent include compounds represented by the following formula (III):

$$R^5—O—CO—O—R^6 \quad (III)$$

wherein $R^5$ and $R^6$ each independently represent H or an unsubstituted or substituted alkyl group, or $R^5$ and $R^6$ combine with each other to form an alkylene group having 2 to 6 carbon atoms.

Specific preferred examples of the compound represented by the formula (III) include ethylene carbonate (m.p. 36° C.).

Lactamide, acetamide, N-methyl acetamide, methyl carbamate, ethyl carbamate, ε-caprolactam, δ-valerolactam, nicotinamide, dimethylolurea, ethyleneurea, and ethylene carbonate glycolic amide and α-amino-ε-caprolactam are particularly preferred because they have high compatibility with the above oil dyes, disperse dyes, and pigments readily soluble in an solvent.

Water and other components

Water used in the ink composition of the present invention is preferably pure water or ultrapure water, such as ion-exchanged water, water purified by ultrafiltration, water purified by reverse osmosis, and distilled water. When the ink is stored for a long period of time, water is preferably sterilized by ultraviolet irradiation, addition of hydrogen peroxide or the like from the viewpoint of preventing the growth of mold and bacteria.

If necessary, the ink composition of the present invention may contain additives commonly used in water-base ink compositions, especially ink compositions for ink jet recording, such as penetration promoters, viscosity modifiers, surface tension modifiers, hydrotropy modifiers, humectants, pH adjustors, antimolds, chelating agents, antiseptics, and rust preventives.

More specifically, ethanol, isopropanol, butanol, pentanol, 2-pyrrolidone, N-methyl pyrrolidone and the like may be added mainly as the penetration promoter. According to a preferred embodiment of the present invention, the penetration rate of the ink composition is not more than 20 sac with or without the addition of the penetration promoter when the amount of the printing ink is 2.5 mg/cm².

Water-soluble resins, such as polyvinyl alcohol, polyvinyl pyrrolidone, casein, polyimine, carboxy methyl cellulose, gum arabic and the like may be mainly used as the viscosity modifier. According to a preferred embodiment of the present invention, the viscosity of the ink composition is preferably not more than 50 cPs at 5° C. with or without use of the viscosity modifier.

Further, alcohols, such as diethanolamine, triethanolamine, glycerin, and diethylene glycol, and nonionic, cationic, anionic or amphoteric surfactants may be mainly used as the surface tension modifier. According to a preferred embodiment of the present invention, the surface tension of the ink composition is preferably in the range of from 25 to 70 dyn/cm with or without use of the surface tension modifier. When the surfactant is added to the water-base ink composition in order to modify the surface tension, the concentration of the surfactant in the ink composition is preferably brought to below the critical micell concentration of the surfactant from the viewpoint of preventing deterioration in water resistance of the print by solubilization of the colorant in water by the surfactant.

Further, urea, alkylurea, propyleneurea, and thiourea may be mainly added as the hydrotropy agent. The amount of the hydrotropy agent added is preferably in the range of from 0.5 to 20% by weight based on the ink composition.

Further, polyols, such as glycerin, diethylene glycol, maltitol, and sorbitol, may be mainly added as the humectant. The amount of the humectant added is preferably in the range of from 1 to 25% by weight based on the ink composition.

When the ink composition is used in an ink jet recording system utilizing electrification, a specific resistance modifier selected from inorganic salts, such as lithium chloride, sodium chloride, and ammonium chloride, may be added to the ink composition.

Production of ink composition

The ink composition of the present invention can be preferably produced by the following processes. These processes have an advantage that an ink composition with a colorant dispersed therein can be easily provided without any dispersing operation by means of a ball mill, a sand mill, a roll mill, a sand grinder or the like.

Process (A)

In the process (A), a solid solvent is first melted by heating to the melting point or above, and a colorant is dissolved in the hot melt to prepare a colorant solution. The colorant solution is maintained in a melted state, and water or an aqueous solution containing a water-soluble compound among the above optional additives is added thereto to precipitate the colorant, thereby preparing a colorant dispersion. Water-soluble additives usable herein include alcohols, such as ethanol, isopropanol, butanol, and pentanol, 2-pyrrolidone, N-methylpyrrolidone, diethanolamine, triethanolamine, glycerin, and diethylene glycol. The remaining additive(s) is added to and mixed with the colorant dispersion at room temperature or with heating to prepare the ink composition of the present invention.

According to this process, a colorant dispersion can be prepared simply by mixing the colorant solution with water or the aqueous additive solution. While there is no intention of being bound by any particular theory to account for simple preparation of the above colorant dispersion, the reason for this is believed as follows. In the colorant solution, the colorant is in a dissolved molecule state. The solubility of the colorant decreases as water or the aqueous additive solution is added. This causes the colorant to be changed from a dissolved state to an insoluble state, resulting in nucleation of ultrafine particles of the colorant. When the solubility is further reduced, the colorant is successively precipitated onto the surface of the nuclei, resulting in growth of the ultrafine particles to fine particles. This is because the colorant has a minimum particle diameter of about 25 nm and is precipitated in a preferred state, i.e., a monodisperse state without causing coalescence of particles.

Process (B)

The ink composition of the present invention may be prepared by the following production process which is a modification of process (A).

In this process, an aqueous saturated solid solvent solution or an aqueous solid solvent solution having a high concentration close to the saturation is prepared, and a colorant is dissolved in the solution to prepare a colorant solution. Water or an aqueous solution containing a water-soluble compound among the above optional additives is added thereto to precipitate the colorant, thereby preparing a colorant dispersion. The remaining additive(s) is then added to and mixed with the colorant dispersion to prepare the ink composition of the present invention.

This process too can provide a good colorant dispersion. The reason for this is considered to be the same as that described in connection with the process (A).

Process (C)

Further, the ink composition of the present invention may be prepared by the following production process. In the present process, a solid solvent is first heated to the melting point or above to prepare a hot melt, and a colorant is dissolved in the hot melt to prepare a colorant solution. The colorant solution is cooled to prepare a colorant solid solution containing a colorant and a solid solvent. Subsequently, the colorant solid solution is dissolved in water or an aqueous solution containing a water-soluble compound among the above optional additives. In this case, the solid solution is dissolved in water or the aqueous additive solution. However, it is considered that the component which is actually dissolved in water or the aqueous solution is the solid solvent component in the solid solution and the colorant component in the solid solution is dispersed as particles without dissolution in water or the aqueous solution. Thus, a colorant dispersion can be prepared. Thereafter, the remaining additive(s) is added to and mixed with the colorant dispersion at room temperature or with heating to prepare the ink composition of the present invention.

Method (D)

The ink composition of the present invention may be prepared by the following production process which is a modification of process (C). In the present process, a solid solvent is mixed with a volatile organic solvent, and a colorant is dissolved therein to prepare a colorant solution. The volatile organic solvent is then removed from the colorant solution by evaporation to prepare a colorant solid solution. Preferably, the volatile organic solvent can dissolve the colorant and has a boiling point below the boiling point of the solid solvent. Specific examples of the volatile organic solvent include alcohols such as methanol, ethanol, and propanol; ketones such as acetone and methyl ethyl ketone; aromatic hydrocarbons such as toluene; esters such as methyl acetate and ethyl acetate; nitrogen compounds such as acetonitrile and triethylamine; and sulfur compound such as thiophene. This solid solution is then dissolved in water or an aqueous additive solution in the same manner as described above in connection with process (C) to prepare a colorant dispersion and an ink composition.

EXAMPLES

The present invention will now be described in more detail with reference to the following examples, though it is not limited to these examples only.

Example 1

Lactamide (150 g) as a solid solvent was heated to 60° C. to prepare a hot melt, and 50 g of Kayaset Yellow A-G (C.I. Disperse Yellow 54, manufactured by Nippon Kayaku Co., Ltd.), a yellow disperse dye, was added to and dissolved in the hot melt with stirring to prepare a colorant solution. An aqueous solution (800 g) containing 12.5% by weight of ethyleneurea as a hydrotropy agent was heated to 60° C., and the colorant solution kept at 60° C. was added thereto with stirring over a period of 4 hr, thereby preparing a colorant dispersion. The dispersion was cooled to room temperature, 5 g of pentanol as a penetration promoter and 50 g of glycerin as a humectant were added thereto with stirring, and the mixture was filtered through a 20-μm filter to prepare a yellow ink.

Examples 2 to 7

Water-base ink compositions were prepared in the same manner as in Example 1, except that the colorant, the amount of the colorant added, the amount of the solid solvent added, and the amount of additives were varied as specified in Tables 1 and 2.

Example 8

ε-Caprolactam (165 g) as a solid solvent was mixed with and dissolved in 55 g of pure water to prepare a 75 wt % aqueous ε-caprolactam solution. Aizen Sot Pink 1 (35 g, C.I. Solvent Red 49, manufactured by Hodogaya Chemical Co., Ltd.), an oil-soluble red dye, was added thereto with stirring, and the mixture was heated to prepare a colorant solution. The colorant solution was cooled to room temperature and added with stirring to 800 g of water containing 12.5% by weight of urea as a hydrotropy agent over a period of 4 hr, thereby preparing a colorant dispersion. Further, 20 g of ethanol as a penetration promoter and 30 g of maltitol as a humectant were added to the dispersion, and the mixture was filtered through a 20-μm filter to prepare a red ink.

Examples 9 to 11

Water-base ink compositions were prepared in the same manner as in Example 8, except that the colorant, the amount of the colorant added, the amount of the solid solvent added, and the amount of additives were varied as specified in Tables 1 and 2.

Example 12

Methyl carbamate (100 g) as a solid solvent was mixed with 50 g of N-methylpyrrolidone as a penetration promoter to prepare a mixed solvent, and 30 g of Filester Violet BA (trade name, Ciba-Geigy, C.I. Disperse Violet 57), a blue disperse dye, was added to and dissolved in the solvent with stirring to prepare a colorant solution. The colorant solution was added with stirring to 800 g of water containing 10% by weight of propyleneurea as a hydrotropy agent over a period of 2 hr to prepare a colorant dispersion. Further, 30 g of sorbitol as a humectant was added to the dispersion, and the mixture was filtered through a 20-μm filter to prepare a blue ink.

Examples 13 to 15

Water-base ink compositions were prepared in the same manner as in Example 11, except that the colorant, the amount of the colorant added, the amount of the solid solvent added, and the amount of additives were varied as specified in Tables 1 and 2.

Example 16

ε-Caprolactam (150 g) as a solid solvent was heated to 80° C. to prepare a hot melt, and 50 g of Kayaset Yellow A-G (trade name, Nippon Kayaku Co., Ltd., C.I. Disperse Yellow 54), a yellow disperse dye, was added to and heat-dissolved in the melt, followed by cooling to room temperature, thereby preparing a colorant solid solution. The colorant solid solution was added to 800 g of water containing 12.5% by weight of ethyleneurea as a hydrotropy agent, and the mixture was stirred for 10 hr, thereby preparing a colorant dispersion. Ethanol (20 g) as a penetration promoter and 50 g of glycerin as a humectant were added thereto with stirring, and the mixture was filtered through a 20-μm filter to prepare a yellow ink.

Examples 17 to 22

Water-base ink compositions were prepared in the same manner as in Example 16, except that the colorant, the amount of the colorant added, the amount of the solid solvent added, and the amount of additives were varied as specified in Tables 1 and 2.

Example 23

δ-Valerolactam (150 g) as a solid solvent was mixed with and dissolved in 100 g of acetone to prepare a mixed solvent. Spirit Black AB (25 g, trade name, Orient Chemical Industries, Ltd., C.I. Solvent Black 5), an oil-soluble black dye, was added to and dissolved in the mixed solvent, and the mixture was heated to remove acetone by evaporation to prepare a colorant solid solution. The colorant solid solution was added to 800 g of water containing 12.5% by weight of urea as a hydrotropy agent, and the mixture was stirred for 15 hr, thereby preparing a colorant dispersion. Pentanol (5 g) as a penetration promoter and 30 g of maltitol as a humectant were added thereto with stirring, and the mixture was filtered through a 20-μm filter to prepare a black ink.

Examples 24 to 26

Water-base ink compositions were prepared in the same manner as in Example 23, except that the colorant, the amount of the colorant added, the amount of the solid solvent added, and the amount of additives were varied as specified in Tables 1 and 2.

Example 27

Ethylene carbonate (150 g) as a solid solvent was heated to 40° C. to prepare a hot melt, and 50 g of Kayaset Yellow A-G (trade name, Nippon Kayaku Co., Ltd., C.I. Disperse Yellow 54), a yellow disperse dye, was added to and heat-dissolved in the melt with stirring to prepare a colorant solution. Water (800 g) containing 12.5% by weight of ethyleneurea as a hydrotropy agent was heated to 40° C., and the colorant solution was added thereto while heating and stirring over a period of 4 hr, thereby preparing a colorant dispersion. Pentanol (5 g) as a penetration promoter and 50 g of glycerin as a humectant were added thereto with stirring, and the mixture was then filtered through a 20-μm filter to prepare a yellow ink.

Examples 28 to 30

Water-base ink compositions were prepared in the same manner as in Example 27, except that the colorant, the amount of the colorant added, the amount of the solid solvent added, and the amount of additives were varied as specified in Tables 1 and 2.

In Table 1, additive A is a hydrotropy agent, additive B is a penetration promoter, and additive C is a humectant.

TABLE 1

| Example | Colorant (g) | Solvent (g) | A (g) | B (g) | C (g) |
|---|---|---|---|---|---|
| 1 | 50 | 150 | 100 | 5 | 50 |
| 2 | 5 | 10 | 100 | 5 | 50 |
| 3 | 200 | 500 | 0 | 0 | 0 |
| 4 | 35 | 165 | 100 | 5 | 50 |
| 5 | 30 | 170 | 100 | 5 | 50 |
| 6 | 25 | 175 | 100 | 5 | 50 |
| 7 | 50 | 150 | 100 | 5 | 50 |
| 8 | 35 | 165 | 100 | 20 | 30 |
| 9 | 5 | 10 | 100 | 20 | 30 |
| 10 | 200 | 500 | 0 | 0 | 0 |
| 11 | 50 | 150 | 100 | 20 | 30 |
| 12 | 30 | 100 | 80 | 50 | 30 |
| 13 | 5 | 10 | 80 | 50 | 30 |
| 14 | 200 | 500 | 0 | 0 | 0 |
| 15 | 50 | 100 | 80 | 50 | 30 |
| 16 | 50 | 150 | 100 | 20 | 50 |
| 17 | 5 | 10 | 100 | 20 | 50 |
| 18 | 200 | 500 | 0 | 0 | 0 |
| 19 | 35 | 165 | 100 | 20 | 50 |
| 20 | 30 | 170 | 100 | 20 | 50 |
| 21 | 25 | 175 | 100 | 20 | 50 |
| 22 | 50 | 150 | 100 | 20 | 50 |
| 23 | 25 | 150 | 100 | 5 | 30 |
| 24 | 5 | 10 | 100 | 5 | 30 |
| 25 | 200 | 500 | 0 | 0 | 0 |

TABLE 1-continued

| Example | Colorant (g) | Solvent (g) | Additives A (g) | B (g) | C (g) |
|---|---|---|---|---|---|
| 26 | 50 | 150 | 100 | 5 | 30 |
| 27 | 50 | 150 | 100 | 5 | 50 |
| 28 | 5 | 10 | 100 | 5 | 50 |
| 29 | 200 | 500 | 0 | 0 | 0 |
| 30 | 35 | 165 | 100 | 5 | 50 |

TABLE 2

| Example | Colorant (trade name) |
|---|---|
| 1 | Kayaset Yellow A-G |
| 2 | Kayaset Yellow A-G |
| 3 | Kayaset Yellow A-G |
| 4 | Kayaset Red B |
| 5 | FILESTER Violet BA |
| 6 | Oil Black 860 |
| 7 | Kayaset Yellow E-AR |
| 8 | Aizen Sot Pink-1 |
| 9 | Aizen Sot Pink-1 |
| 10 | Aizen Sot Pink-1 |
| 11 | Olacet Pink RF |
| 12 | FILESTER Violet BA |
| 13 | FILESTER Violet BA |
| 14 | FILESTER Violet BA |
| 15 | Pink 6G |
| 16 | Kayaset Yellow A-G |
| 17 | Kayaset Yellow A-G |
| 18 | Kayaset Yellow A-G |
| 19 | Kayaset Red B |
| 20 | FILESTER Violet BA |
| 21 | Spirit Black AB |
| 22 | Olacet Pink RF |
| 23 | Spirit Black AB |
| 24 | Spirit Black AB |
| 25 | Spirit Black AB |
| 26 | Pink 6G |
| 27 | Kayaset Yellow A-G |
| 28 | Kayaset Yellow A-G |
| 29 | Kayaset Yellow A-G |
| 30 | Kayaset Red B |

Comparative Example 1

In the preparation of an ink, N-methylpyrrolidone was used instead of the solid solvent. Specifically, 45 g of Spirit Black AB (trade name, Orient Chemical Industries, Ltd., C.I. Solvent Black 5), an oil-soluble black dye, was added to and dissolved in 350 g of N-methylpyrrolidone, and 50 g of ethylene glycol and 30 g of urea were added thereto, and pure water was then added with stirring so that the total amount of the solution became 1000 g. Thereafter, the solution was filtered through a 20-μm filter to prepare a solution type black ink containing an oil-soluble dye.

Comparative Example 2

In the preparation of an ink, 1,3-dimethyl-2-imidazolidinone was used instead of the solid solvent. 30 g of Kayaset Yellow A-G (trade name, Nippon Kayaku Co., Ltd., C.I. Disperse Yellow 54), a yellow disperse dye, was mixed with 100 g of 1,3-dimethyl-2-imidazolidinone, 10 g of ethylene glycol as a humectant, and 50 g of sodium dodecylbenzenesulfonate as an anionic surface active agent. Pure water was added to the mixture so that the total amount of the mixture became 1000 g. The mixture was dispersed by means of a ball mill for 24 hr and then filtered through a 20-μm filter to prepare a dispersion type yellow ink containing a disperse dye.

Comparative Example 3

In the preparation of an ink, N-methylpyrrolidone was used instead of the solid solvent. 50 g of Sumitone Cyanine Blue (trade name, Sumitomo Chemical Co., Ltd., C.I. Pigment Blue 15), a blue pigment, was mixed with 150 g of N-methylpyrrolidone, 100 g of ethylene glycol as a humectant, 100 g of SMA resin 1440H (trade name, ARCO Chemical, styrene/maleic acid copolymer), and 10 g of dimethyl aminoethanol. Pure water was added to the mixture so that the total amount of the mixture became 1000 g. The mixture was dispersed by means of a ball mill for 18 hr and then filtered through a 20-μm filter to prepare a dispersion type blue ink containing a pigment.

Test on Evaluation of Properties

Printing was carried out by means of an ink jet recording device using water-base ink compositions prepared in the Examples and the Comparative Examples to evaluate the drying property of the prints, the printing stability in terms of clogging with the ink, and the fastness of the prints.

The printing stability was evaluated by filling an ink jet recording device with the ink, allowing the ink jet recording device to stand at room temperature for one week in this state without wearing a rubber cap for preventing the ink from drying, and then attempting the projection of the ink through a nozzle of the ink jet recording device.

The fastness was evaluated in terms of water resistance and light fastness. The water resistance was evaluated by a water dropping test specified in JIS L 0853, that is, by falling one drop of water on the printed face, allowing the print in this state until the print is completely dried, and then judging the water resistance in terms of the degree of fading in the printed face. The light fastness was evaluated by a night and day method in a sunlight test specified in JIS L 0841, that is, by exposing the print to sunlight night and day and judging the light fastness in terms of the degree of fading.

For all the inks prepared in the examples, the projection of the ink could be successfully resumed even after standing at room temperature for one week, that is, the printing stability was good. Further, for the water resistance, little or no elution of the colorant on the paper into a portion other than the printed area was observed, and there was no fading in the printed face. That is, the fastness to water was good. For the light fastness, the lowering in optical density was 10 to 40%, and the printed letters were legible also even after the exposure. That is, the fastness to light was good.

Furthermore, the ink compositions prepared in the exmaples exhibited stable continuous projection, good penetration into paper, and storage stability of the ink.

On the other hand, for the comparative inks, the printing stability was such that the ink could not be projected after standing for one week, although the water resistance and the light fastness were comparable to those for the inks of the exmaples.

I claim:

1. A water-base ink composition comprising:

a colorant which is either sparingly soluble or insoluble in water;

a solid solvent which is solid at room temperature and soluble in water and can dissolve, in the form of a hot melt or aqueous solution thereof, the colorant and, can form a solid solution together with the colorant; and water.

2. The water-base ink composition according to claim 1, wherein the colorant is selected from the group consisting of an oil-soluble dye, a disperse dye, and a pigment readily soluble in the solvent.

3. The water-base ink composition according to claim 1, wherein the solid solvent has a melting point of 30° C. or above.

4. The water-base ink composition according to claim 1, wherein the solid solvent is selected from the group consisting of carboxylic acid derivatives, urea derivatives, and alkylene carbonates.

5. The water-base ink composition according to claim 4, wherein the carboxylic acid derivatives are represented by the following formula (I):

wherein $R^1$ represents an unsubstituted or substituted alkyl or unsubstituted or substituted alkoxy group, or a five- or six-membered heteroaromatic ring containing one nitrogen atom, $R^2$ represents H or an unsubstituted or substituted alkyl group, or $R^1$ and $R^2$ are an unsubstituted or substituted alkylene group having 3 to 8 carbon atoms.

6. The water-base ink composition according to claim 4, wherein the urea derivatives are represented by the following formula (II):

wherein $R^3$ and $R^4$ each independently represent H or an unsubstituted or substituted alkyl group, or $R^3$ and $R^4$ combine with each other to form an alkylene group having 2 to 6 carbon atoms.

7. The water-base ink composition according to claim 4, wherein the alkylene carbonates are represented by the following formula (III):

wherein $R^5$ and $R^6$ each independently represent H or an unsubstituted or substituted alkyl group, or $R^5$ and $R^6$ combine with each other to form an alkylene group having 2 to 6 carbon atoms.

8. The water-base ink composition according to claim 1, wherein the solid solvent is selected from the group consisting of lactamide, acetamide, N-methyl acetamide, methyl carbamate, ethyl carbamate, ε-caprolactam, δ-valerolactam, α-amino-ε-caprolactam, glycolic amide, dimethylol urea, ethylene urea, nicotinamide, and ethylene carbonate.

9. The water-base ink composition according to claim 8, wherein the solid solvent is selected from the group consisting of lactamide, ε-caprolactam, methyl carbamate, δ-valerolactam, and ethylene carbonate.

10. The water-base ink composition according to claim 1, wherein the solid solvent is contained in an amount of 1 to 50% by weight of the ink composition.

11. A process for producing a water-base ink composition according to claim 1, comprising the steps of:

heating the solid solvent at the melting point or above to form a hot melt and dissolving a colorant in the melt to prepare a colorant solution;

mixing the colorant solution in a hot melt form with water or an aqueous solution containing a water-soluble organic solvent to prepare a dispersion in which particles of the colorant are dispersed; and adding optional components, for forming an ink composition, to the dispersion.

12. A process for producing a water-base ink composition according to claim 1, comprising the steps of:

dissolving a colorant in an aqueous solution to prepare a colorant solution wherein the aqueous solution is an aqueous saturated solid solvent solution or an aqueous solid solvent solution having a high concentration close to the saturation;

mixing the colorant solution with water or an aqueous solution containing a water-soluble organic solvent to prepare a dispersion in which particles of the colorant are dispersed; and adding optional components, for forming an ink composition, to the dispersion.

13. A process for producing a water-base ink composition according to claim 1, comprising the steps of:

heating the solid solvent at the melting point or above to form a hot melt and dissolving a colorant in the melt to prepare a colorant solution;

cooling the colorant solution to prepare a colorant solid solution containing the colorant and the solid solvent;

dissolving the colorant solid solution in water or an aqueous solution containing a water-soluble organic solvent to prepare a dispersion in which particles of the colorant are dispersed; and adding optional components, for forming an ink composition, to the dispersion.

14. A process for producing a water-base ink composition according to claim 1, comprising the steps of:

mixing a solid solvent with a volatile organic solvent, dissolving a colorant in the mixture to prepare a colorant solution, and removing the volatile organic solvent by evaporation to prepare a colorant solid solution;

dissolving the colorant solid solution in water or an aqueous solution containing a water-soluble organic solvent to prepare a dispersion in which particles of the colorant are dispersed; and adding optional components, for forming an ink composition, to the dispersion.

15. A water-base ink composition comprising:

a) a colorant which is either sparingly soluble or insoluble in water; said colorant being present in the composition in an amount of 0.5 to 20% by weight, said colorant comprising particles having an average particle diameter of from 10 nm to 10 μm;

b) a solid solvent which has a melting point of 30° C. or above and is soluble in water and can dissolve, in the form of a hot melt or aqueous solution, the colorant and can form a solid solution with the colorant, said solid solvent being present in the composition in an amount of 1 to 50% by weight and being selected from the group consisting of carboxylic acid derivatives, urea derivatives and alkylene carbonates; and c) water present in the composition in an amount by weight which exceeds the amount of the solid solvent.

16. The water-base ink composition according to claim 15, wherein the composition consists essentially of said colorant, solid solvent and water.

17. The water-base ink composition according to claim 15, wherein the composition is substantially free of any dispersant.

18. The water-base ink composition according to claim 17, wherein the solid solvent is a carboxylic acid derivative represented by the following formula (I):

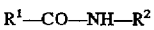

wherein $R^1$ represents an unsubstituted or substituted alkyl or unsubstituted or substituted alkoxy group, or a five or six-membered heteroaromatic ring containing one nitrogen atom, represents H or an unsubstituted or substituted alkyl group, or $R^1$ and $R^2$ are an unsubstituted or substituted alkylene group having 3 to 8 carbon atoms.

19. The water-base ink composition according to claim 17, wherein the solid solvent is a urea derivative represented by the following formula (II):

$$R^3\text{—NH—CO—NH—}R^4 \qquad \text{(II)}$$

wherein $R^3$ and $R^4$ each independently represent H or an unsubstituted or substituted alkyl group, or $R^3$ and $R^4$ combine with each other to form an alkylene group having 2 to 6 carbon atoms.

20. The water-base ink composition according to claim 17, wherein the solid solvent is an alkylene carbonate represented by the following formula (III):

$$R^5\text{—O—CO—O—}R^6 \qquad \text{(III)}$$

wherein $R^5$ and $R^6$ each independently represent H or an unsubstituted or substituted alkyl group, or $R^5$ and $R^6$ combine with each other to form an alkylene group having 2 to 6 carbon atoms.

* * * * *